United States Patent [19]

Carroll et al.

[11] Patent Number: 4,619,085
[45] Date of Patent: Oct. 28, 1986

[54] GRAIN BIN FLOOR AND METHOD OF MAKING SAME

[75] Inventors: Michael W. Carroll, Roselle; Michael E. Harwood, Palatine, both of Ill.

[73] Assignee: North American Agricultural, Inc., Schaumburg, Ill.

[21] Appl. No.: 580,464

[22] Filed: Feb. 15, 1984

[51] Int. Cl.[4] .............................................. E04H 7/00
[52] U.S. Cl. ........................................ 52/192; 52/303; 52/263; 52/588; 52/824
[58] Field of Search ..................... 52/126.5, 126.6, 192, 52/198, 245, 480, 687, 689, 729–731, DIG. 6, 727, 728, 824, 825, 263, 588

[56] References Cited

U.S. PATENT DOCUMENTS

| 31,368 | 9/1883 | Trumper | 52/588 X |
| 947,514 | 1/1910 | Stevens | 52/480 X |
| 1,674,476 | 6/1928 | Mathews | 52/687 X |
| 1,768,547 | 7/1930 | Englund | 52/DIG. 6 |
| 3,283,459 | 11/1966 | Beranek et al. | 52/263 |
| 3,426,445 | 2/1969 | Steffen | 52/192 X |
| 3,591,994 | 7/1971 | Steffen | 52/303 X |
| 4,229,919 | 10/1980 | Hughes | 52/263 |

FOREIGN PATENT DOCUMENTS 58176 11/1940 Denmark ...................... 52/DIG. 6

Primary Examiner—Carl D. Friedman
Assistant Examiner—Naoko N. Slack
Attorney, Agent, or Firm—Fitch, Even, Tabin & Flannery

[57] ABSTRACT

A grain bin floor is formed of floor plates supported on horizontal beams supported by vertical columns made of sheet metal with lower ends of the columns having bendable teeth or the like bent by high spots in the base that would otherwise concentrate the load onto a small portion of the column and cause its failure. The preferred floor uses wood beams and the columns. Preferably, the floor plates are fastened to the beams and the latter and bearing members are interlocked to the columns. An easy method of assemblying the columns, beams and bearing plates is disclosed.

8 Claims, 11 Drawing Figures

U.S. Patent  Oct. 28, 1986  Sheet 1 of 3  4,619,085
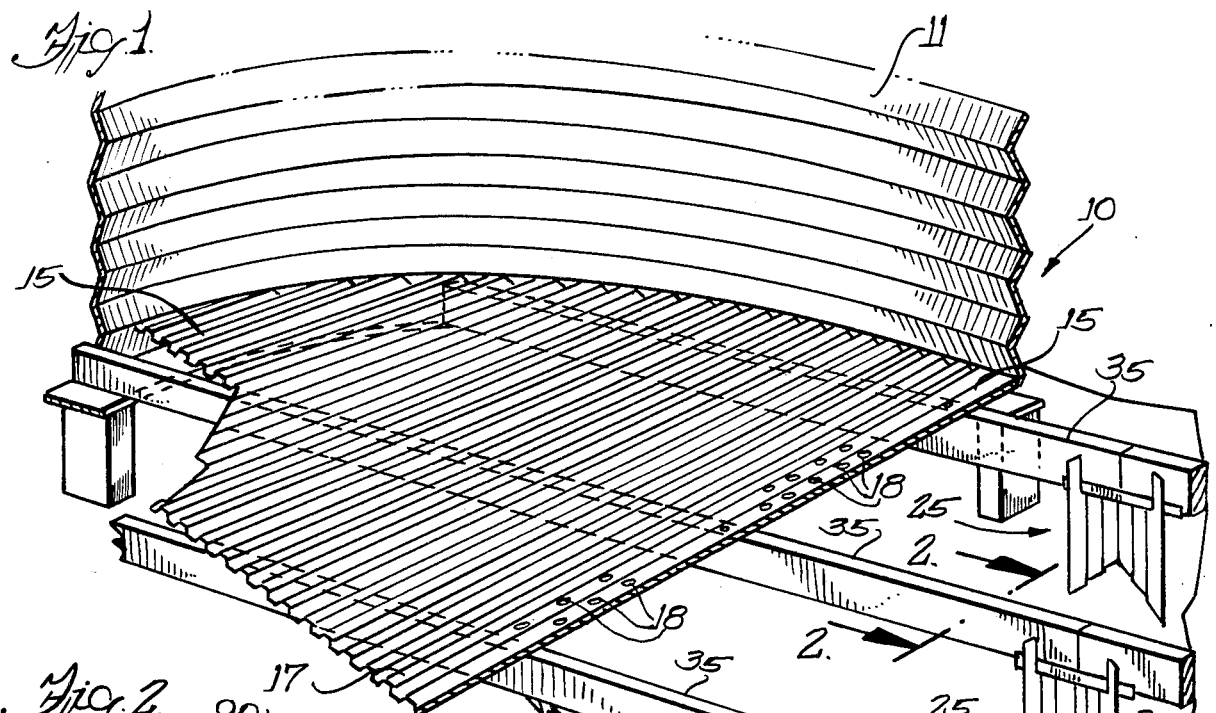
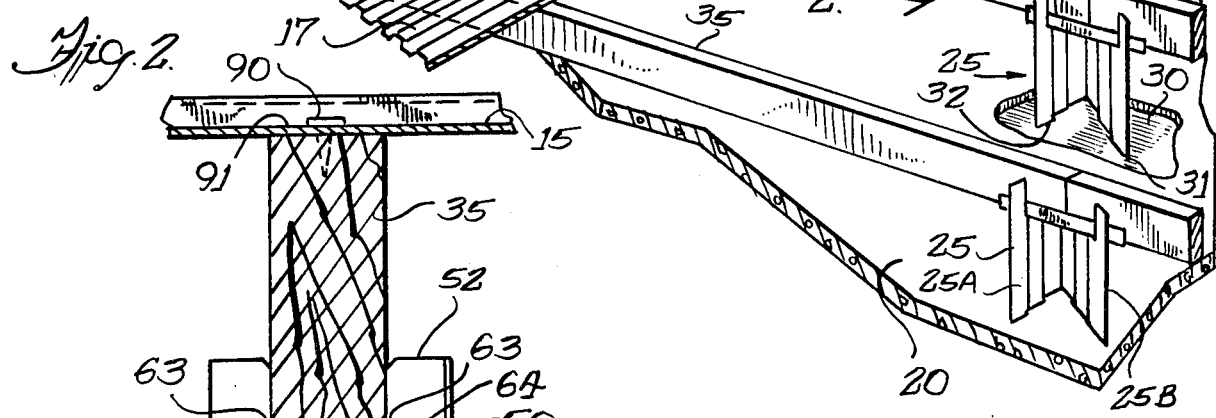
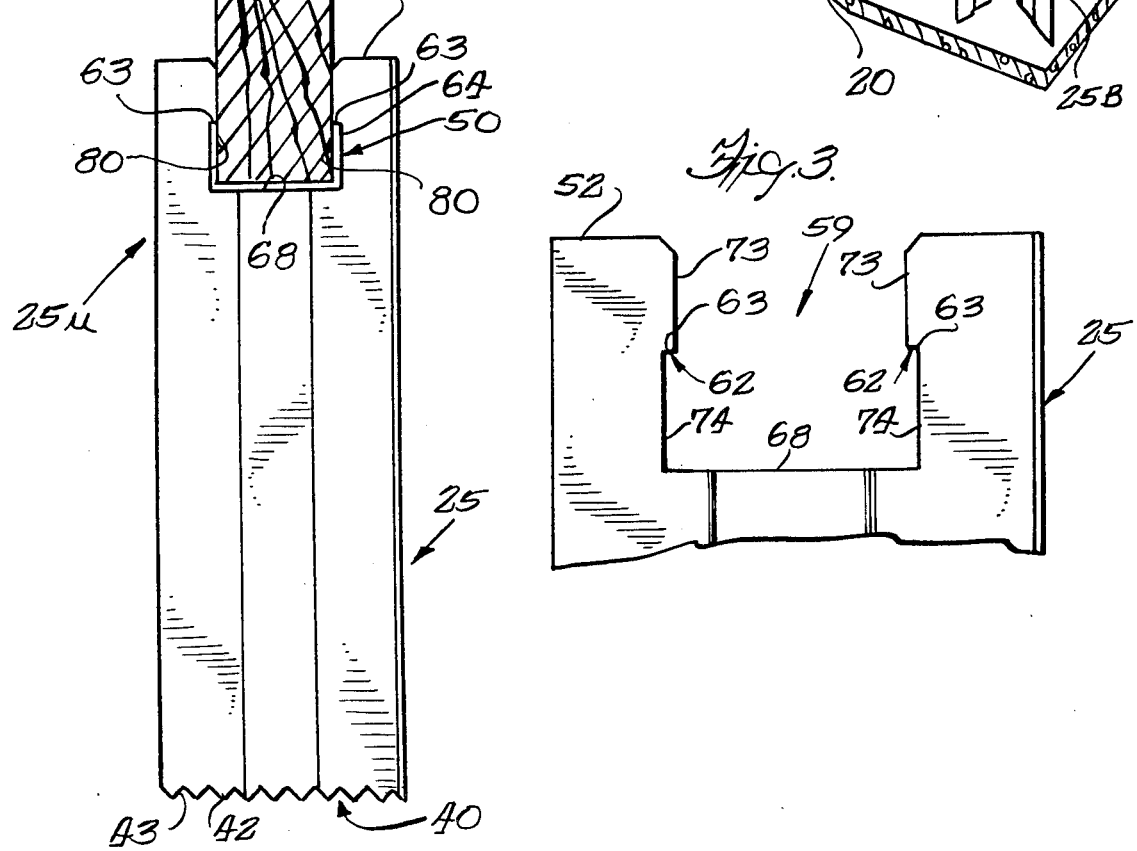

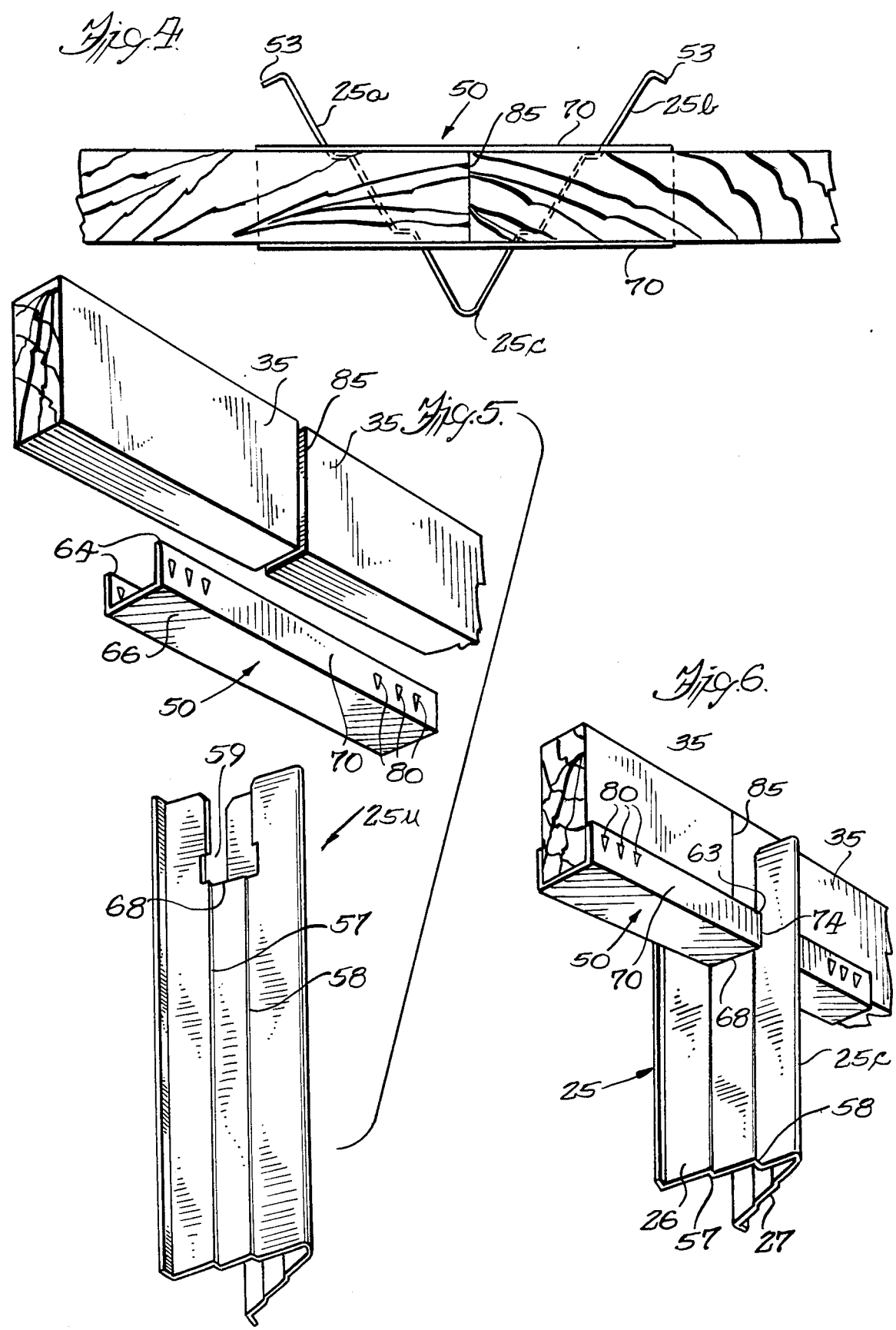

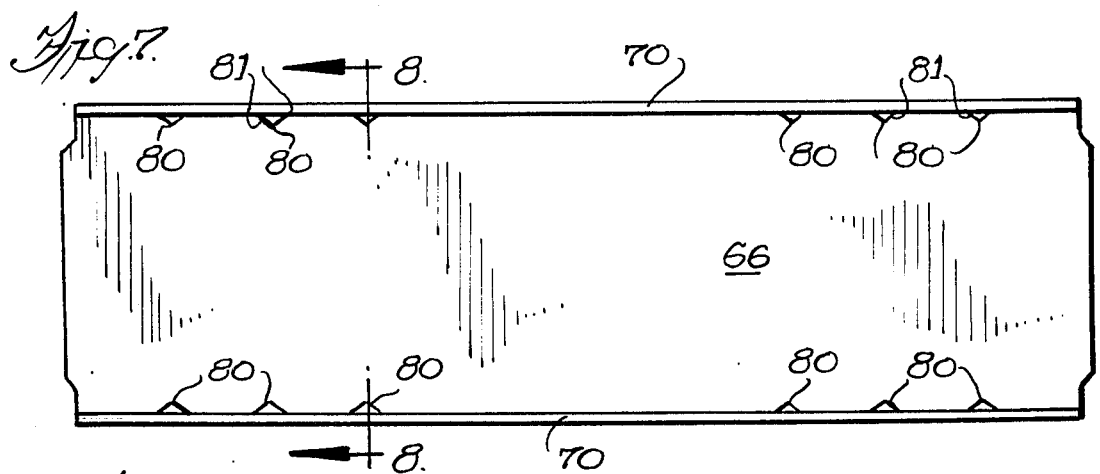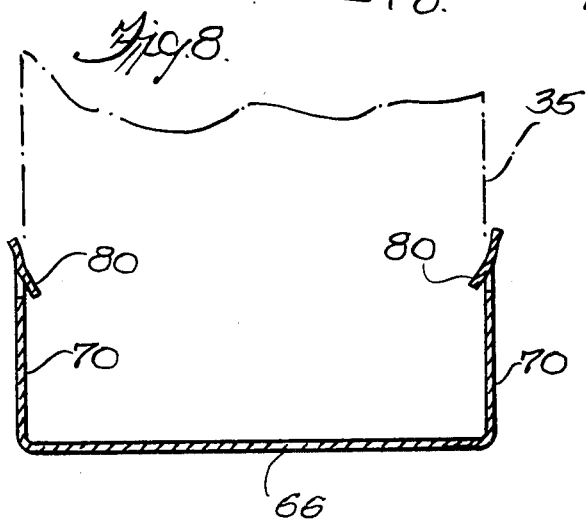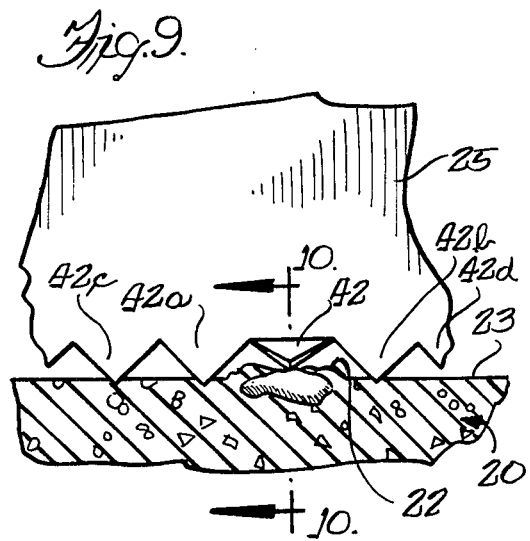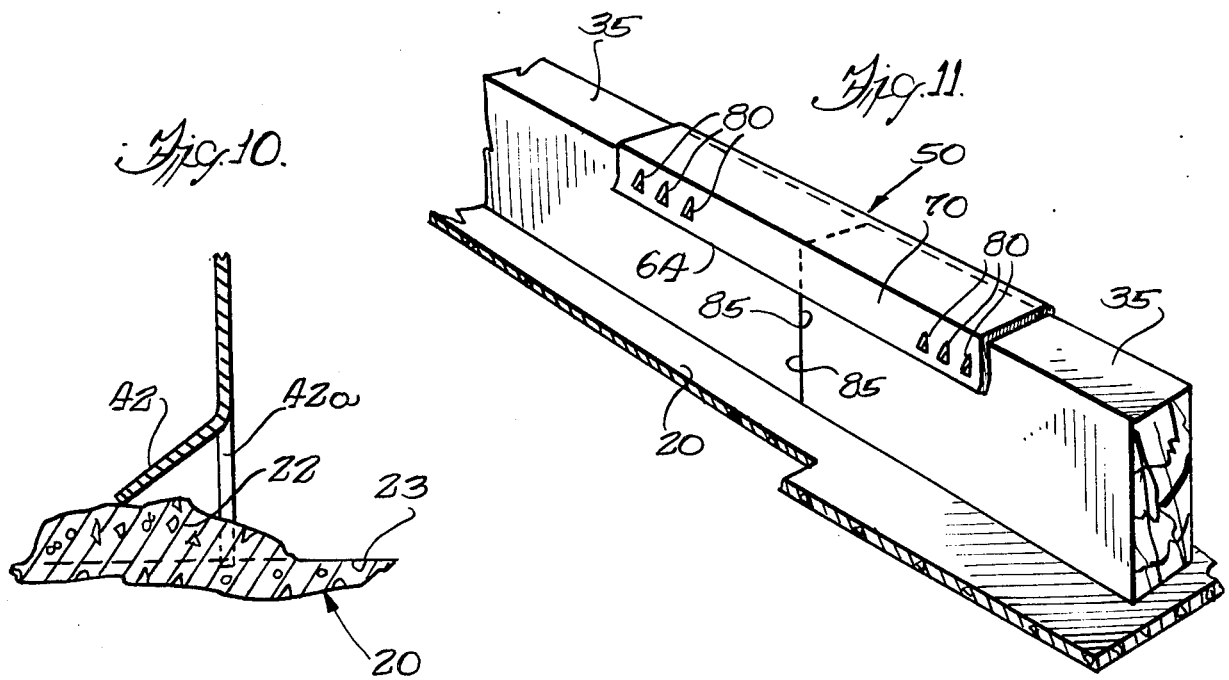

GRAIN BIN FLOOR AND METHOD OF MAKING SAME

BACKGROUND OF THE INVENTION

This invention relates to floors for grain bins, or the like, and on particularly to aerated floors systems which have vertical columns supporting the floor above a base or pad so that air may flow and circulate beneath the floor and upwardly through the grain.

The present invention is directed to a grain bin flooring which may use floor plates generally of the kind described in co-pending application Ser. No. 573,969 filed Jan. 26, 84, now U.S. Pat. No. 4,562,678, assigned to the assignee of this invention. The floor plates disclosed in that patent application comprise a plurality of corrugated sheets having openings therein through which air may be blown or otherwise distributed to aerate the grain resting on the floor plates. A typical cylindrical grain bin has a circular shaped floor spaced above an underlying concrete pad.

The underlying air frame or support for the floor plates illustrated in the aforementioned patent application comprises bent wire frame sections of generally "Z" shape which are one form of air frame which may be used with the flooring plates and system described therein. The present invention is directed to an improved support for the floor plates and may be used with the floor plates of the co-pending application or other types of floor plates such as shown in U.S. Pat. No. 4,418,558. In the latter patent, narrow width floor plates have their side edges bent into channel shaped configurations to form integral metal beams along both sides of the floor plate. These integral metal beams may be supported in various manners. For instance, short sheet metal columns formed with a plurality of legs may be disposed at a series of locations below the integral channel shaped beams with the lower ends of the sheet metal columns having ends resting on the concrete pad.

Another form of flooring heretofore used had the floor plates supported on wooden 2×4's or 2×6's resting on concrete block columns. However, the 2×4's or 2×6's were not able to be positioned vertically with the longer dimension extending vertically to provide a greater load carrying capacity as these wooden beams tended to be displaced and turned when grain was deposited onto floor.

The ease of assemblying and cost of the grain bin floor as well as its load bearing characteristics are very important to the successful marketing of a grain bin floor. The typical grain bin floor is assembled by a farmer or an unskilled laborer, which he has employed, to assemble the beams and columns onto a concrete pad. The typical concrete pad onto which the air frame is positioned often has uneven spots or uneven pieces of aggregate in the concrete exposed providing unever areas. It will be appreciated that sheet metal columns which are bent into a particular shape to give rigidity thereto may rest on such high points of exposed aggregate. Such high points cause a concentration of load and an uneven distribution of load across sheet metal columns which then may twist or buckle under heavy loading. Further, there may be uneven areas or dips of large dimensions in the concrete pad resulting in low spots so that beams may actually be spaced from the flooring plates at the low spot locations until the grain is deposited onto the floor plates. In such instances, the loading of grain onto the floor causes a lifting or a knocking over of a column or beam when the same are loosely attached or freely positioned one over another. To alleviate this, the present invention finds it desirable to secure the beams floor plates and columns to each other so that they will remain in a stable, uniform configuration even though the lower end of the column may be spaced above the concrete until a substantial weight of grain is placed on the flooring thereabove.

Accordingly, the general object of the present invention is to arrive at a new and improved grain floor system and a method of making the same.

Another object of the invention is to provide a new and improved column for grain bin floors.

These and other objects and advantages of the invention will become more apparent from the following detailed description taken in conjunction with the accompanying drawings in which:

FIG. 1 is a perspective view of a grain bin floor constructed in accordance with the preferred embodiment of the invention.

FIG. 2 is an enlarged sectional view taken substantially along the lines 2—2 of FIG. 1.

FIG. 3 is an enlarged elevational view of the upper end of a column constructed in accordance with the preferred embodiment of the invention.

FIG. 4 is a plan view of a pair of beams supported by a bearing member.

FIG. 5 is an exploded view of a pair of beams, a bearing member and a column constructed in accordance with the present invention.

FIG. 6 shows the pieces of FIG. 5 assembled.

FIG. 7 is a plan view of a bearing member.

FIG. 8 is a cross-sectional view taken along the line 8—8 of FIG. 7.

FIG. 9 is an enlarged diagramatic view of a point being bent by a piece of aggregate.

FIG. 10 is a sectional view taken substantially along the line 10—10 of FIG. 9.

FIG. 11 is a view showing a bearing plate being attached while being inverted over the top of a pair of wooden beams.

As shown in the drawings for purposes of illustration, the invention is embodied in a grain bin 10 having an upstanding sidewall 11 which may be of cylindrical shape and formed of corrugated metal. Extending within the confines of the sidewall 11 and providing a floor or flooring system for receiving a load grain are a plurality of floor plates 15 which are formed of metal and are preferably corrugated as shown at 17 and are provided with the plurality air or aeration openings or holes 18 in each of the corrugated portions 17 for the flow of air which is usually blown through the grain.

In the aforementioned patent application which is hereby incorporated by reference as if fully reproduced herein, the horizontally disposed floor plates 15 are supported on an air frame which includes "Z" shaped wire frames having a top horizontal wire engaging the under surface of the floor plates and a lower wire which rests on a concrete pad such as the concrete pad 20 shown in FIG. 1. Typically, the concrete pad is formed by farmers or unskilled laborers hired by farmers which pour the floor and may leave uneven areas such as high points 22 in the top surface 23 of the concrete floor 20 as shown in FIGS. 9 and 10. Such uneven spots concentrated the column load at one point on the column leg and are a cause of failure because the load bends the column shape and it tends to buckle and lose its ability to support the weight. Additionally, it sometimes occurs that a low spot area 30 (FIG. 1) is in the concrete and that the column and beam thereon would be spaced from the floor plates. Then, because these prior art assemblies were loosely assembly, the uneven dropping of grain on the floor plates, in some instances, may have caused the beams and/or columns to displace from each other and lose their load bearing capacity. Thus there is a need for new and improved grain flooring system using sheet metal columns.

In accordance with the present invention, the grain flooring system may be better supported on a base or concrete pad 20 having high points 22 thereon because of a load distributing capability afforded by relieved column ends 40 disposed on the lower ends of the columns 25 which have portions such as teeth 42 which bend or deflect and to spread the load across the column. This is achieved in the preferred embodiment of the invention by providing a plurality of individual teeth 42 with spaced grooves 43 therebetween at the relieved lower end 40 with a tooth 42, as best seen in FIGS. 9 and 10 actually bending and deflecting when the load tends to concentrates on a tooth and the bending of this tooth results in the load being transferred to adjacent teeth 42a and 42b, etc. In a series of tests, it has been found that the providing of such teeth and the ability of the teeth to bend and transfer the load to adjacent areas has increased the test loads significantly, e.g. from 4400 to 5700 pounds in one test. Particular advantages are achieved when the high point 22 of aggregate, or the like, is located at a corner 25c between legs 25a and 25b which define a general "V" shape for the preferred column herein illustrated. With a high point at the juncture a load of five thousand pounds was carried in one test with a column having a flat lower end; as contrasted, when a bendable tooth was located at and bent at the juncture, the load carried increased to 6250 pounds in a similar test.

In accordance with another important aspect of the invention, the preferred flooring system includes wooden beams 35 held in an on-edge position with their longer dimensions being vertical to provide greater load carrying capacity and with the beams being interlocked to the columns and to the floor plates to prevent a toppling or otherwise disassociation thereof when the lower ends of the columns define a space 31 with a low spot 30 in the pad 20 and grain is deposited on the flooring to push the lower end of the column to take up the space 31. Additionally, it has been found that greater strength is achieved by rigidifying the column at its upper end and/or its lower end to resist bending or twisting torques tending to bend the column end from its normal configuration. To this end, a bearing member 50 formed of metal is attached to the beam 25 and is secured thereto to rigidify the upper ends of the legs 25a and 25b.

As will be explained in greater detail hereinafter, the bearing members 50 serve as rigid metal members interlocked across the upper ends of the columns to prevent the upper ends of the legs from bending or twisting due to heavy torque loads. Additionally, the teeth 42 bite into the concrete as shown in FIGS. 9 and 10 under heavy loading to assist in holding the legs 25a and 25b against twisting or bending and losing their shape at their lower ends. Thus, it is preferred at both the upper ends and the lower ends of the sheet metal channels be held in position when under loading so as to provide rigidity and stability to the column shape under heavy loading.

Turning now in greater detail to the illustrated embodiment of the invention, the preferred columns 25 may be made of 20 gauge steel with an angle of about 60° between the legs 25a and 25b. The particular material used for the columns is preferably a galvanized metal to resist corrosion and to provide a low-cost column. The typical height of a beam from an upper edge 52 FIG. 2 to a lower end of a tooth 42 may be about 9.75 inches. The maximum width of the columns herein may be about 5.28 inches between outer edges 53 of the legs 25a and 25b as shown in FIG. 4. Also, by way of example, the maximum depth dimension from the "V" to the edges of the legs may be about 3.125 inches. It is to be understood that each of the dimensions and materials given herein is by way of example only and not in by way of limitation. Other dimensions and shapes of materials may be used for the columns and still seemed to be within the purview of the present invention. To assist in rigifying the legs 25a and 25b, they are preferably bent to form vertical extending ribs 57 and 58 extending the entire heighth from the teeth to the bottom of an upwardly open slot 59 (FIG. 5). To provide further rigidity and strength the outer ends 53 of the columns are also bent to form vertical flanges on the outer edges of the column.

Also, by way of example only, the illustrated teeth 42 may be about 0.125 inches in heighth and formed at a 90° into sharp lower points. Of course, other shapes of teeth or relieved areas may be provided to provide a deflectable or deformable portion which alleviates load concentration at a particular high spot in the floor pad. It has been observed that as a tooth 42 bends it serves to transfer the load to adjacent teeth such as 42a, 42b, etc with the load being spread more uniformly even though there is a high spot 22 located below one or more teeth of one of the legs 25a and 25b.

The preferred upwardly opening slot 59 for the bearing member 50 is shown in FIG. 3 as having interlocking means 62 which interlock with portions of the bearing member 50 to prevent separation of the column 25 and the bearing member should the latter be lifted at a low spot 30 in the pad 20 as shown for the middle column 25 in FIG. 1. The preferred interlocking means 62 includes a pair of inwardly directed shoulders 63 which will snap over longitudinal upper edges 64 of the bearing member 50 when bottom web 66 of the bearing member is pushed downwardly to abut the slot bottom walls 68 formed in each of the legs 25a and 25b. Thus, as best seen in FIGS. 2 and 6, upper edges 64 of vertical flanges 70 of the channel shaped bearing member 50 abut the respective shoulders 63 of the interlocking means 62 to interlock the bearing member to the column 25. The particular spacing between the upper vertical walls 73 at the top of the slot 59, as best seen in FIG. 3, is closer together than the two lower vertical walls 74. The upper ends 52 of the column expand slightly as the bearing member with the beam therein is brought home into the slot 59 to abut web 66 against bottom wall 68 of a slot 59. By way of example, the space between the upper slot walls 73 to receive the bearing member may be about 1.50 inches with an additional 0.15 inches spacing being provided between the lower walls 74 to provide a shoulder 63 of about 0.075 inches on each side of the slot 59.

The preferred and illustrated bearing member 50 is likewise formed of metal such as 24 gauge galvanized sheet metal and may be about 5.32 inches in length and about 3 inches in width from outer side to outer side. Typically, the internal channel dimension for a nominal 2×6 is about 1.510 inches. To secure or fasten the bearing plate to the wooden beams, the same is driven onto the wooden beams with downwardly projecting barbs or tabs 80 as best seen in FIG. 8 being driven into the wood to prevent separation off the channel and the wooden beam. By way of example only, there are provided a total of 12 such pointed tabs 80 with six being on each web 70, as best seen in FIG. 7. The preferred tabs may be about one-quarter inch in length in the vertical direction and may project inwardly about one-sixteenth inch and sides 81 of the tabs may define an included angle of about 60°.

With six tabs 80 being provided at each end of the bearing member 50, the bearing member may be used to span ends 85 of a pair of beams 35 as best seen in FIG. 11 to join and hold the ends 85 against shifting relative to one another. Thus, as viewing in FIG. 11, both the left end and the right end beams 35 will each have six tabs 80 holding the same against removal from the beam. The bearing members preferably are driven onto the upper side of the beam while it is inverted at the time of the application of the bearing member to the beam.

As best seen in FIG. 11, the bearing member 50 is assembled on the beam 20 typically on the concrete pad 20 and then a column will likewise be inverted over the bearing plate 50 and driven downwardly to snap fit its slot 59 and the interlocking means 62 therein against the edges 64 of the webs 70. Then, the entire beam with several columns 25 thereon projecting upwardly may be inverted and moved into position.

It will be appreciated that a column 25 may be provided at various locations along the length of the beam 35 and indeed there are many more columns than are graphically illustrated in FIG. 1. Also, the bearing member 50 and its column 25 may be attached to an end of the beam leaving one half of the upwardly facing channel to receive an end of another wooden beam which then may be driven downwardly to abut end faces 85 of the beams as shown in FIG. 1. It is of course to be understood that one of the main purposes of the bearing member 50 is to prevent the bottom wall 68 of the slot 59 from biting deeply into the wooden beam. In tests run without the bearing member 50 it has been found that the wood will be severely crushed and that the wall 68 will bite deeply into the wood and provide for less load bearing capacity. As clearly shown in FIGS. 2 and 6, the legs 70 of the channel shape member 50 abut the vertical walls 74 of the slot and the bottom web 66 abuts the bottom wall 68 of the column. The beam 35, the channel member 50, and the upper end of the column in each column leg are thus tightly abutted to rigidify the upper end of the column. An impression of the lower wall 68 of the slot 59 is formed in the bottom web 66 of the bearing member 50 upon loading thus preventing the legs 25a and 25b of the column 25 from bending inward, thereby rigidifying the column at its upper end.

In accordance with another important aspect of the invention, it is preferred to the floor plates 15 that may be fastened such as by self-tapping screws 90 or other fasteners (FIG. 2) which are driven downwardly through the sheet metal flooring 15 and threaded into tops 91 of the underlying beam 35. Thus, the entire assembly is fastened or secured together with the screws 90 securing the floor plates 15 to the beams 35. To the lower ends of the beams 35 are secured the bearing members 50 which have tabs 80 embedded into the wood. The bearing members 50 are interlocked by means 62 to the top of the columns 25. Because the bearing member spans the column legs and is interlocked in the respective legs 25a and 25b, the upper ends of the columns are rigidified to keep their column shape. At the lower ends of the columns the teeth 42 biting into the concrete to prevent twisting or the loss of the shape for the lower end of the column. Additionally, one or more teeth may deflect at a high point so as to spread the load onto the remainder of the column without deformation and twisting of the column which causes it to be severely weakened.

From the foregoing, it will be seen there is provided a new and improved grain bin floor. The floor is comprised of inexpensive members which are uniquely configured and interlocked to provide rigidity to the floor. The pieces of the grain bin floor may be readily assembled with unskilled help and will provide a strong floor at a low cost.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. A grain floor for storing grain and for supporting the grain above a base which may be uneven at certain locations, said floor comprising
   a plurality of corrugated floor plates defining a substantially horizontal floor to receive grain thereon,
   a plurality of beams extending horizontally and longitudinally beneath the floor plates supporting the floor plates and grain thereon, said beams being arranged in parallel rows and extending normal to the corrugations,
   said beams being spaced laterally of each other,
   a plurality of vertical metal columns disposed beneath the beams and supporting the beams at spaced locations along the length of the beams,
   said columns being formed of sheet metal and having at least two vertical legs joined at angles to each other,
   said beams being made of wood with a rectangular cross section having the longer dimension disposed vertically, said beams being made of a plurality of portions with the portions being aligned in a straight line, and
   bearing means spanning the legs of said column and secured to said wooden beam to transfer load from the wooden beam to the column, said bearing means being substantially shorter in length than the portions of the beams, said bearing means being made of metal and preventing the edges of the sheet metal legs from digging into said wooden beams and serving to distribute the load between the beams and the legs,
   co-acting means on the bearing means and legs for rigidifying the legs against bending inward under loading from the grain, and
   interlocking means on the beams and bearing means to hold the beams against turning and against separation from the bearing means.

2. A grain floor in accordance with claim 1 in which a plurality of bendable teeth are provided on the lower ends of the columns to bend and to distribute a load.

3. A grain floor in accordance with claim 1 in which the bearing means is channel shaped for receiving therein the beam and in which integral pointed tabs on the sides of the channel penetrate the wooden beam and resist separation of the wooden beam from the channel shaped bearing means.

4. A grain floor for storing grain and for supporting the grain above a concrete base which may be uneven at certain locations, said floor comprising a plurality of corrugated floor plates having corrugations running in a first direction defining a substantially horizontal floor to receive grain thereon, a plurality of beams extending horizontally and longitudinally beneath the floor plates supporting the floor plates and grain thereon, said beams extending normal to the corrugations in the floor plates and being arranged in parallel rows, said beams being spaced laterally of each other, a plurality of vertical metal columns disposed beneath the beams and supporting the beams at spaced locations along the length of the beams, said columns being formed of metal and having at least two vertical legs joined at an angle to each other, and relieved lower ends on the columns having portions engaging the concrete base at spaced points and capable of deflecting with loads thereon to distribute the weight borne by the column to adjacent portions to aid in resisting buckling of the column under loading.

5. A grain floor in accordance with claim 4 in which the beams have a rectangular cross section having the longer dimension disposed vertically.

6. A grain floor in accordance with claim 5 in which a bearing means spans the legs of said column and said bearing means is secured to said wooden beam.

7. A grain floor in accordance with claim 6 in which interlocking means on the columns and the bearing means holds the legs against twisting and locks the legs at the top of each column.

8. A grain floor in accordance with claim 7 in which the relieved lower ends are provided with a plurality of bendable teeth, said teeth penetrating into the base and aiding in holding the lower ends of the column legs against deformation relative to one another under loading.

* * * * *